(12) United States Patent
Göricke et al.

(10) Patent No.: US 12,145,650 B2
(45) Date of Patent: Nov. 19, 2024

(54) METHOD FOR ASSISTING A DRIVER WITH A MANUAL PARKING PROCEDURE OF A MOTOR VEHICLE AND MOTOR VEHICLE

(71) Applicant: Volkswagen Aktiengesellschaft, Wolfsburg (DE)

(72) Inventors: Bastian Göricke, Wolfsburg (DE); Philipp Hüger, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 294 days.

(21) Appl. No.: 17/681,960

(22) Filed: Feb. 28, 2022

(65) Prior Publication Data
US 2022/0274645 A1 Sep. 1, 2022

(30) Foreign Application Priority Data
Feb. 26, 2021 (DE) ...................... 10 2021 201 866.1

(51) Int. Cl.
*B62D 15/02* (2006.01)
*G08G 1/16* (2006.01)

(52) U.S. Cl.
CPC ........... *B62D 15/027* (2013.01); *G08G 1/168* (2013.01)

(58) Field of Classification Search
CPC ...... B62D 15/027; B62D 6/002; B62D 6/003; G08G 1/168; G01S 2013/9314; G01S 2015/932; B60R 2300/806
See application file for complete search history.

(56) References Cited

U.S. PATENT DOCUMENTS 5,742,141 A * 4/1998 Czekaj ............... B62D 15/0285
180/199
6,483,442 B2 * 11/2002 Shimizu ............... B62D 15/027
340/901
(Continued)

FOREIGN PATENT DOCUMENTS

| CN | 102458951 A | 5/2012 | ............ B60W 30/06 |
| DE | 102005062086 A1 | 7/2006 | ............ B60W 30/06 |

(Continued)

OTHER PUBLICATIONS

German Office Action, Application No. 102021201866.1, 5 pages, Aug. 18, 2021.
(Continued)

*Primary Examiner* — Jason Holloway
*Assistant Examiner* — Benjamin J Brosh
(74) *Attorney, Agent, or Firm* — Slayden Grubert Beard PLLC (57) ABSTRACT

The disclosure relates to a method for assisting a driver with a manual parking procedure of a motor vehicle, wherein a processor is used to determine a target parking space and a position of the motor vehicle, to determine at least one driving setting of the motor vehicle, to determine a reachability of the target parking space proceeding from the position using the at least one determined driving setting, and to facilitate actuation of a steering of the motor vehicle by the driver by applying at least one steering torque to the steering if it is determined that the target parking space cannot be reached proceeding from the position with the at least one determined driving setting.

19 Claims, 4 Drawing Sheets

(56) References Cited

U.S. PATENT DOCUMENTS

| | | | |
|---|---|---|---|
| 7,800,516 B2 | 9/2010 | Lüke | 340/932.2 |
| 7,825,828 B2 | 11/2010 | Watanabe et al. | 340/932.2 |
| 10,077,072 B2 | 9/2018 | Hori et al. | |
| 10,078,789 B2 | 9/2018 | Gupta et al. | |
| 2003/0078713 A1* | 4/2003 | Tanaka | B62D 15/028 701/41 |
| 2007/0282502 A1* | 12/2007 | Bayer | B62D 15/028 701/42 |
| 2010/0114434 A1* | 5/2010 | Kawabata | B60R 1/00 701/41 |
| 2010/0332078 A1 | 12/2010 | Hering et al. | 701/36 |
| 2012/0072067 A1 | 3/2012 | Jecker et al. | 701/25 |
| 2013/0184925 A1 | 7/2013 | Niemz et al. | 701/25 |
| 2013/0289825 A1* | 10/2013 | Noh | B62D 15/027 701/41 |
| 2020/0307559 A1 | 10/2020 | Göricke et al. | |
| 2022/0080956 A1 | 3/2022 | Seeland et al. | |
| 2023/0039125 A1* | 2/2023 | Kunz | G06V 20/58 |

FOREIGN PATENT DOCUMENTS

| | | | | |
|---|---|---|---|---|
| DE | 102009046726 A1 | 5/2011 | | B60R 1/10 |
| DE | 102010049585 A1 | 4/2012 | | B60W 30/06 |
| DE | 102013214660 A1 | 1/2015 | | B60W 10/04 |
| DE | 102020211548 B3 | 12/2021 | | B60W 30/06 |
| DE | 102020211549 A1 | 3/2022 | | B60W 50/08 |
| EP | 1847444 A1 | 10/2007 | | B62D 15/02 |
| EP | 2975593 A1 | 1/2016 | | B60W 30/06 |
| EP | 3424801 A1 | 1/2019 | | B60W 30/06 |
| JP | 2003054341 A | 2/2003 | | B60R 21/00 |
| JP | 2006021722 A | 1/2006 | | B60R 1/00 |
| JP | 2007326414 A | 12/2007 | | B62D 5/04 |
| JP | 2009184649 A | 8/2009 | | B60R 21/00 |
| KR | 20150038776 A | 4/2015 | | B60W 30/06 |

OTHER PUBLICATIONS

Japanese Office Action, Application No. 2022028281, 7 pages, May 8, 2023.

European Office Action, Application No. 22154978.5, 8 pages, Apr. 25, 2024.

European Office Action, Application No. 22154978.5, 7 pages, Sep. 23, 2024.

* cited by examiner

METHOD FOR ASSISTING A DRIVER WITH A MANUAL PARKING PROCEDURE OF A MOTOR VEHICLE AND MOTOR VEHICLE

CROSS-REFERENCE TO RELATED APPLICATIONS

This application claims priority to German Patent Application No. DE 10 2021 201 866.1, filed on Feb. 26, 2021 with the German Patent and Trademark Office. The contents of the aforesaid Patent Application are incorporated herein for all purposes.

TECHNICAL FIELD

The invention relates to a method for assisting a driver with a manual parking procedure of a motor vehicle and to a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Parking a motor vehicle manually, i.e., manual parking, requires training or respectively experience from the driver of the motor vehicle. In the case of small parallel parking spaces or in the case of diagonal parking, for example, a driver may quickly misjudge and steer in too early or too late. In the case of parallel parking, for example, this may result in abortion of a parking procedure or in a poor parking result, for example on account of too great a distance from a curb.

SUMMARY

A need exists for a solution by means of which a driver of a motor vehicle may be assisted with a manual parking procedure.

The need is addressed by the subject matter of the independent claims. Embodiments of the invention are disclosed in the dependent claims, the description, and the FIGS.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Embodiments relate to a method for assisting a driver with a manual parking procedure of a motor vehicle, for example a motor car, for example a passenger car. In the manual parking procedure, the motor vehicle is longitudinally and/or transversely controlled by the driver. In the method, it is provided that a target parking space and a position of the motor vehicle are determined. In this connection, the position of the motor vehicle for example in relation to the target parking space may be determined. The target parking space and/or the position of the motor vehicle may, for example, be determined by means of a detector (also interchangeably referred to as 'detection apparatus' herein) of the motor vehicle. The detection apparatus may, for example, comprise a camera and/or a lidar and/or a radar and/or ultrasound sensors. Alternatively or additionally and in some embodiments, the position of the motor vehicle may be determined by means of a global navigation satellite (GPS) receiver. In in some embodiments, at least one driving setting of the motor vehicle is determined. A driving movement of the motor vehicle may be set by means of the at least one driving setting of the motor vehicle. As such, the at least one driving setting defines a driving characteristic of the motor vehicle.

Furthermore and in some embodiments, a processor (also herein interchangeably referred to as an 'electronic computing apparatus' or a 'processing circuit') is used to determine a reachability of the target parking space proceeding from the position using the at least one determined driving setting of the motor vehicle. It is therefore in some embodiments determined whether the motor vehicle may reach the target parking space in one move using the driving movement set by means of the at least one driving setting. If it is determined that the target parking space cannot be reached by the motor vehicle proceeding from the position with the at least one determined driving setting and thus the motor vehicle cannot be parked in the target parking space in one move with the current at least one driving setting, and in some embodiments, at least one supporting steering torque is applied to a steering of the motor vehicle in order to facilitate actuation of the steering by the driver.

Therefore, when it is determined that the target parking space is unreachable in one move using the at least one determined driving setting, the at least one steering torque by means of which a steering movement initiated by the driver is facilitated is applied to the steering. As such, by means of the steering torque, the driver may in some embodiments be prompted to carry out a steering movement by means of the steering in a direction specified by means of the steering torque in order for it to be possible to reach the target parking space in one move by means of the motor vehicle. The at least one steering torque applied to the steering may be set, for example, depending on how the at least one determined driving characteristic of the motor vehicle would have to be adjusted in order for it to be possible to reach the target parking space in one move proceeding from the relevant position of the motor vehicle. As such, the driver is prompted by means of the provided at least one steering torque to adjust the at least one driving setting of the motor vehicle such that the target parking space may be reached proceeding from the position of the motor vehicle using the adjusted at least one driving setting.

A force that is to be applied by means of the driver in order to actuate the steering may in some embodiments be reduced compared with an initial force by means of the at least one steering torque applied to the steering, such that the driver may be assisted with steering of the motor vehicle. In this connection, the at least one steering torque may be provided, for example, by means of a hydraulic system and/or an electric motor to the steering. Herein, the terms 'steering' and 'steering apparatus' are used interchangeably.

If it is established that the target parking space may be reached by the motor vehicle in one move proceeding from the position of the motor vehicle with the at least one determined driving setting, and in some embodiments, the at least one steering torque does not need to be provided. If it is established that the target parking space may be reached in one move proceeding from the relevant position of the motor vehicle and the at least one determined driving setting, and in some embodiments, it is established that the driver has sufficient control of the motor vehicle in order to completely take over the parking procedure, for example the transverse control of the motor vehicle during the parking procedure. As such, the method makes it possible for the driver of the motor vehicle to manually park the motor vehicle, wherein the driver may be assisted in a particularly convenient manner with the transverse control of the motor vehicle by means of the provision of the at least one steering torque to the driver.

A processor in the present context is understood as hardware, i.e., one or more processing circuits. Programming, software, or one or more algorithms may be provided as a component of the processor or loaded into the processor from an external memory to provide the functionality discussed.

In some embodiments, a steering torque that amplifies a steering movement or a steering torque that impedes a steering movement is applied as the relevant steering torque to the steering. As such, the at least one impeding steering torque may be used to impede a first steering movement of the driver and the facilitating steering torque may be used to facilitate a second steering movement of the driver that is counter to the first steering movement. As a result, by means of the at least one facilitating steering torque or respectively the at least one impeding steering torque, the driver may be prompted to adjust a steering of the motor vehicle in a steering direction specified by means of the at least one steering torque. The at least one facilitating and the at least one impeding steering torque may therefore be provided in order to prompt the driver to adjust a steering setting of the motor vehicle in a steering direction made easier for the driver by means of the facilitating steering torque. As such, the at least one steering torque may in some embodiments be used to prompt the driver in a particularly gentle manner to adjust the determined driving setting in a manner specified by means of the at least one applied steering torque in order to make it possible to reach the target parking space in one move by means of the adjusted driving setting of the motor vehicle.

In some embodiments, the surroundings of the motor vehicle are set into at least two different regions depending on the at least one determined driving setting. In this connection, a first region characterizes the reachability of the target parking space for the at least one determined driving setting and the second region characterizes an unreachability of the target parking space for the at least one determined driving setting. As such, the surroundings of the motor vehicle are split into the at least two regions such that all positions proceeding from which the motor vehicle may reach the target parking space in one move using the at least one determined driving setting make up the first region and all positions of the motor vehicle proceeding from which the motor vehicle cannot reach the target parking space in one move using the at least one determined driving setting make up the second region. In this connection, only those possible positions of the motor vehicle proceeding from which the target parking space may be reached in one move if the at least one determined driving setting is adjusted may make up the second region. Furthermore, the processor may be used to determine which of the regions the motor vehicle is located in. For this purpose, a position of the motor vehicle may be determined. The position of the motor vehicle may, for example, be understood to mean a position of a reference point of the motor vehicle. The steering torque is provided for the steering if it is established that the motor vehicle is located in the second region. Conversely, the steering torque is not provided if it is established that the motor vehicle is located in the first region.

Therefore, a first corridor within which the target parking space may be reached in one move without assistance proceeding from the position of the motor vehicle arranged in the first region using the at least one determined current driving setting of the motor vehicle may be determined as the first region. As a result, the assistance from the applied at least one steering torque is not provided if it is determined that the motor vehicle is located in the first region. The first corridor representing the first region may extend into the target parking space. Furthermore, in the method, a second corridor representing the second region and surrounding the first corridor may also be determined. If the motor vehicle is determined to be arranged in the second corridor, within which the motor vehicle may only reach the target parking space in one move using the at least one determined current driving setting with assistance, the driver of the motor vehicle is assisted with control of the motor vehicle by means of the at least one steering torque being provided. By splitting the surroundings of the motor vehicle into regions, it may be determined in a particularly fast and simple manner whether the target parking space may still be reached when the position of the motor vehicle changes, but with the same respective driving settings.

In some embodiments, a third region may also be provided in the surroundings of the motor vehicle, which third region characterizes an unreachability of the target parking space in one move regardless of the determined driving setting. In other words, if the motor vehicle is in a position in the third region, the motor vehicle cannot reach the target parking space in a single move no matter what the driving setting of the motor vehicle. Therefore, by splitting the surroundings into the first region, second region and third region, it may be established in a particularly fast and simple manner using the processor whether it is necessary, reasonable, and/or sufficient for reaching the target parking space to provide the driver with assistance with parking of the motor vehicle in the target parking space. Based on this, it may be decided using the processor whether the at least one steering torque should be applied to the steering of the motor vehicle in order to assist the driver with parking of the motor vehicle.

In some embodiments, the determined regions are output by means of an output apparatus. Said output apparatus may, for example, be part of the motor vehicle. As such, the output apparatus may be configured to output the determined regions in the interior of the motor vehicle for example using a display, projection, and/or using a voice prompt. By outputting the determined regions in the interior of the motor vehicle by means of the output apparatus, a vehicle occupant of the motor vehicle, for example the driver of the motor vehicle, may be informed in a particularly simple manner of a respective determined reachability of the target parking space with the respective currently set driving settings of the motor vehicle.

In some embodiments, at least one of the regions is split depending on a predefined safety distance to be maintained from at least one detected object. Therefore, if it is determined that the target parking space may be reached in one move proceeding from the relevant current position of the motor vehicle using the at least one determined driving setting, a position and an extent of the at least one object and, if applicable, additionally the predefined safety distance from the object may be factored in. As such, it is determined using the processor whether the target parking space may be reached in one move proceeding from the relevant current position of the motor vehicle using the at least one determined driving setting while avoiding a collision with the at least one object or respectively while maintaining the at least one safety distance predefined for said object. For example, it could be possible to reach the target parking space proceeding from a current position of the motor vehicle using the at least one determined driving setting while violating the at least one predefined safety distance from the object. In order to prevent the motor vehicle from violating the safety distance from the at least one object during parking of the motor vehicle in the target parking space and, as a result, from potentially colliding with the at least one other object, it may be established in some embodiments that the target parking space cannot be reached in one move proceeding from the current position of the motor vehicle using the at least one determined driving setting while also maintaining the safety distance. As a result, it may be established in some embodiments, for example, that the motor vehicle is located in the second region. After it has been determined that the motor vehicle is located in the second region, the driver of the motor vehicle with control of the motor vehicle by applying the at least one steering torque to the steering may be assisted using the processor, such that it is possible to park in the target parking space in one move proceeding from the current position of the motor vehicle using the at least one adjusted driving setting of the motor vehicle while maintaining the safety distance from the at least one object.

In some embodiments, it may be provided that the steering torque is not provided if it is determined that the target parking space cannot be reached proceeding from the position of the motor vehicle regardless of the determined driving setting. In other words, it is possible to dispense with providing the at least one steering torque and thus with applying the at least one steering torque to the steering if it is determined that the motor vehicle is located in the third region. Therefore, if it is established that the target parking space cannot be reached in one move proceeding from the current position of the motor vehicle even in the event of possible assistance for the driver of the motor vehicle, then no assistance is provided to the driver. This prevents suggesting to the driver that the target parking space could in fact be reached by the motor vehicle in one move by adjusting the at least one driving setting.

In some embodiments, the determined reachability of the target parking space may be adjusted if it is determined that the at least one determined driving setting and/or the position of the motor vehicle has/have been adjusted. As a result, it may be continuously checked during a movement of the motor vehicle, for example during a parking procedure, as to whether the respective current driving settings are sufficient for reaching the target parking space in one move. Therefore, if the driver of the motor vehicle changes a steering setting of the steering of the motor vehicle and/or if a position of the motor vehicle relative to the target parking space changes due to travel of the motor vehicle, the respective regions may be adjusted and/or the determined arrangement of the motor vehicle in one of the regions may be checked or respectively even adjusted. As such, the driver may be assisted particularly well throughout the entire manual parking procedure by means of the method.

In some embodiments, a set steering angle and/or a maximum possible steering angle and/or an engaged gear and/or a wheel base of the motor vehicle is determined as the driving setting. The set steering angle and the wheel base of the motor vehicle have an influence on the course of movement of the motor vehicle when the motor vehicle negotiates a curve. The maximum possible steering angle defines respective limits for the motor vehicle negotiating a curve, wherein it may be determined based on the maximum possible steering angle whether the target parking space may be reached in one move by the motor vehicle proceeding the position thereof if the relevant set steering angle in the motor vehicle is adjusted to the maximum possible steering angle. The maximum possible steering angle may therefore define a boundary between the second region and the third region. The gear currently set in the motor vehicle defines whether the motor vehicle is carrying out a forward movement or a backward movement, or respectively will do so when the motor vehicle accelerates. Based on the set steering angle and/or the maximum possible steering angle and/or the engaged gear and/or the wheel base of the motor vehicle, it is possible to determine a possible movement trajectory, for example a set of possible movement trajectories, proceeding from the relevant position of the motor vehicle and, depending on the determined movement trajectory or respectively the determined set of movement trajectories, to determine, in a particularly reliable manner, the reachability of the target parking space for the motor vehicle proceeding from the current position thereof in one move using the respective driving settings.

Some embodiments relate to a motor vehicle that is configured to carry out a method of the like described above for assisting the driver with a manual parking procedure of the motor vehicle. For this purpose, the motor vehicle may comprise a processor that is configured to determine the target parking space and the position of the motor vehicle. Furthermore, the processor may be configured to determine at least one driving setting of the motor vehicle. Moreover, the processor is configured to determine a reachability of the target parking space proceeding from the position of the motor vehicle with the at least one determined driving setting. In addition, the processor is configured to facilitate actuation of a steering of the motor vehicle by the driver by applying at least one steering torque to the steering if it is determined that the target parking space cannot be reached in one move proceeding from the position of the motor vehicle with the at least one determined driving setting.

Embodiments of the discussed method are to be understood to apply to the motor vehicle, and vice versa.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

FIGS. 1*b*, 2*b*, 3*b* and 4*b* each show a schematic plan view of a parking area 10 on which several vehicles 12 are arranged. In addition, a motor vehicle 14 that is to be parked on the parking area 10 is arranged on the parking area 10. The vehicles 12 on the parking area 10 delimit a target parking space 16 in which the motor vehicle 14 is to be parked. The motor vehicle 14 may be parked in the target parking space 16 for example manually by a driver of the motor vehicle. In order to enable particularly simple parking of the motor vehicle 14 in the target parking space 16 in one move, the driver of the motor vehicle 14 may be assisted with a manual parking procedure. In order to establish whether the driver of the motor vehicle 14 requires the assistance, the target parking space 16 and a position 18 of the motor vehicle 14 are determined. In this connection, the position 18 of the motor vehicle 14 may be defined by means of a reference point of the motor vehicle 14.

Furthermore, at least one driving setting of the motor vehicle 14 is determined. A set steering angle and/or an engaged gear may be determined as the at least one driving setting of the motor vehicle 14. Alternatively or additionally and in some embodiments, a maximum possible steering angle and/or a wheel base of the motor vehicle 14 may be determined as unchanging driving settings that influence a driving characteristic of the motor vehicle 14. A reachability of the target parking space 16 in one move proceeding from the position 18 of the motor vehicle 14 using the at least one determined driving setting may be determined using a processor 20 of the motor vehicle 14. The processor 20 is shown schematically as a small box in the present case. In other words, it is determined using the processor 20 whether it is possible to park in the target parking space 16 in a single move proceeding from the relevant position 18 of the motor vehicle 14 with the at least one determined driving setting of the motor vehicle 14.

In the process, the surroundings of the motor vehicle 14 may be split into three distinct regions using the processor 20: a first region 22, a second region 24 and a third region 26. The first region 22 is defined by the fact that, when the position 18 of the motor vehicle 14 is arranged in the first region 22, the motor vehicle 14 may be parked in the target parking space 16 with the determined at least one driving setting of the motor vehicle 14 without the driver of the motor vehicle 14 requiring assistance.

The second region 24 is defined by the fact that, when the position 18 of the motor vehicle 14 is arranged in the second region 24, the target parking space 16 cannot be reached in one move using the at least one determined driving setting of the motor vehicle 14 and therefore adjustment of the at least one driving setting is required in order to reach the target parking space 16 proceeding from the relevant position 18 of the motor vehicle 14. As such, it is possible, in principle, for the motor vehicle 14 to reach the target parking space 16 in one move if the position 18 of the motor vehicle 14 is arranged in the second region 24. The third region 26 is defined by the fact that, when the position 18 of the motor vehicle 14 is arranged in the third region 26, the motor vehicle 14 cannot be parked in the target parking space 16 in one move, regardless of relevant driving settings of the motor vehicle 14. In this connection, the fact of it being impossible to park the motor vehicle 14 in the target parking space 16 in one move is to be understood to mean that collision-free parking of the motor vehicle 14 in the target parking space 16 is not possible.

For example, the regions may be assigned depending on an optimum trajectory in terms of control techniques and/or depending on a trajectory that is most convenient for a driver of the motor vehicle 14. The respective regions may therefore be assigned depending on a human driving style, whereby the aim of the assistance with the manual parking procedure of the driver is to emulate human behavior by means of the provision of the additional torque.

Depending on the respective arrangement of the position 18 of the motor vehicle 14 in the respective regions, the driver of the motor vehicle 14 may be assisted with the manual parking procedure by means of application of at least one steering torque to a steering of the motor vehicle 14 when the steering is actuated by the driver. The steering torque provided for assisting the driver may be defined for the respective regions by a driver. FIGS. 1*a*, 2*a*, 3*a* and 4*a* each show graphs in which a steering torque applied to the steering in order to assist the driver with the parking procedure is plotted as an additional steering torque 28 against a travel region 30. In the first region 22, the second region 24 and the third region 26 are respective travel regions. As such, it is possible to discern from the respective graphs the magnitude of a respective additional steering torque applied to the steering in order to assist the driver with control of the motor vehicle 14 when the motor vehicle 14 is arranged in the respective travel region 30.

Figure 1A:
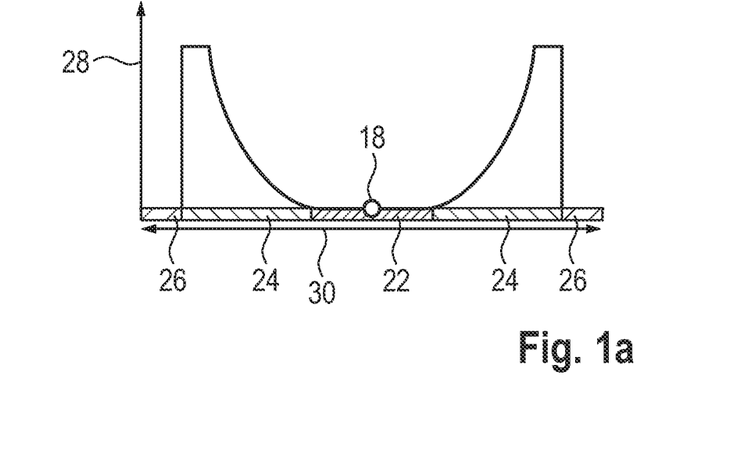
FIG. 1a shows an example graph, in which an additional steering torque to be applied as the steering torque to a steering is plotted against a travel region in which a motor vehicle is located.
Figure 1B:
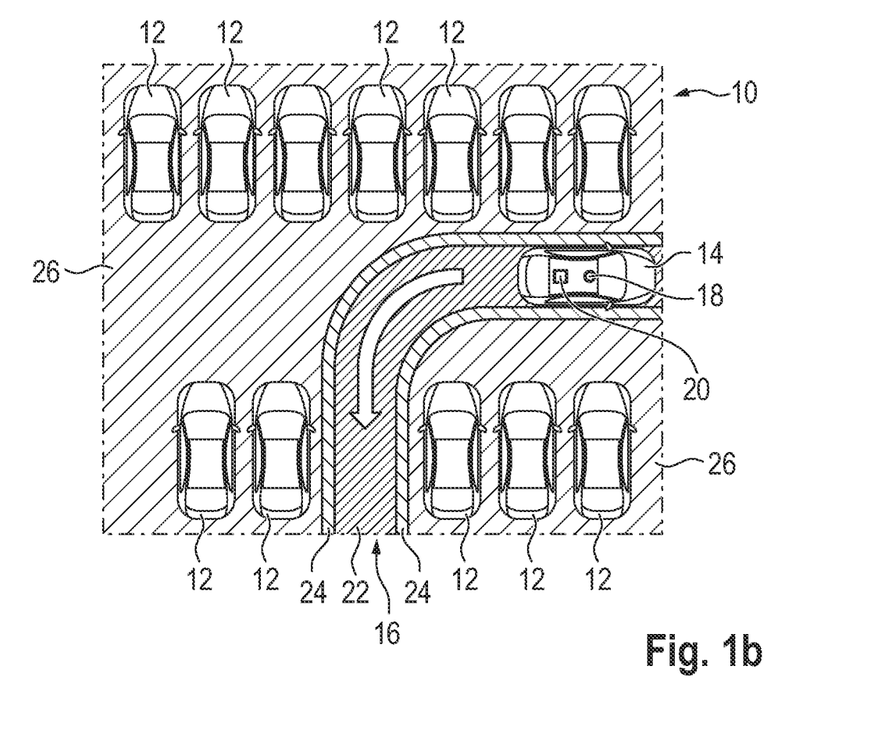
FIG. 1b shows a schematic example plan view of a parking area, on which the motor vehicle is arranged and on which a target parking space in which the motor vehicle is to park is provided for the motor vehicle, wherein the surroundings of the motor vehicle have been split into three different regions and a steering torque may be applied to a steering of the motor vehicle depending on an arrangement of the motor vehicle in the respective regions in order to assist a driver of the motor vehicle.
Figure 2A:
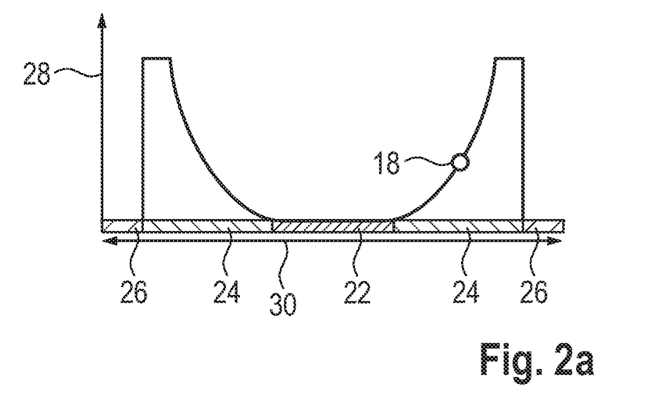
FIG. 2a shows an example graph, which shows the magnitude of a steering torque applied as an additional steering torque to the steering of the motor vehicle for the determined travel region of the motor vehicle.
Figure 2B:
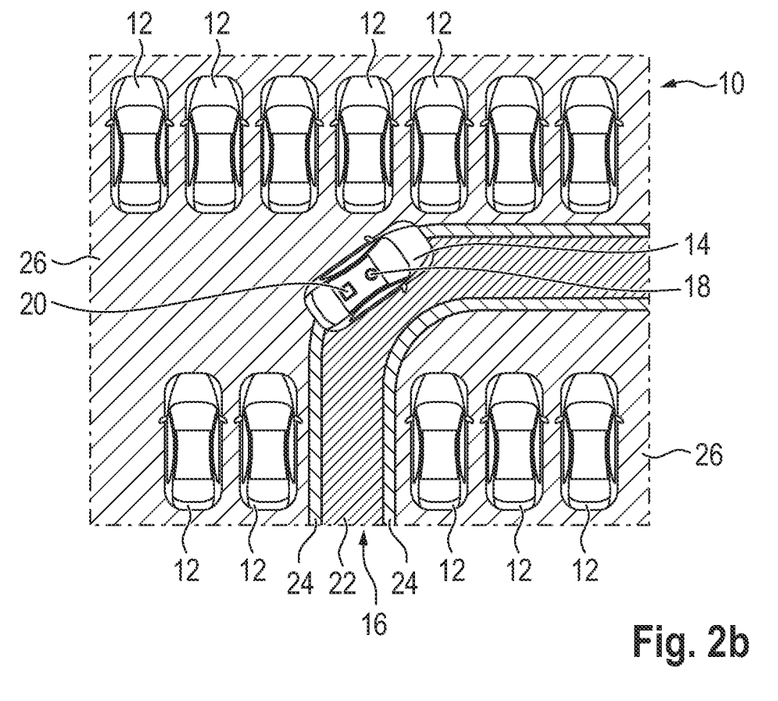
FIG. 2b shows another example schematic plan view of the parking area, wherein the motor vehicle is arranged in one of the regions in which the driver of the motor vehicle is assisted with control of the motor vehicle by means of application of the steering torque to the steering.
Figure 3A:
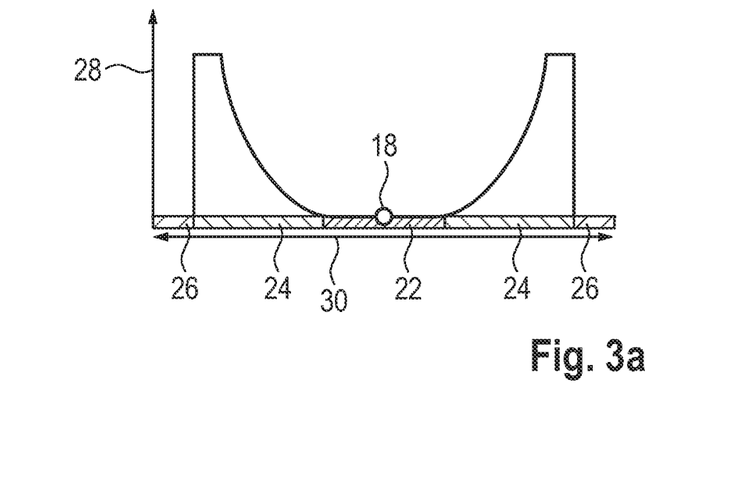
FIG. 3a shows an example graph which shows that no additional steering torque is provided for assisting the driver in the current arrangement of the motor vehicle in the travel region.
Figure 3B:
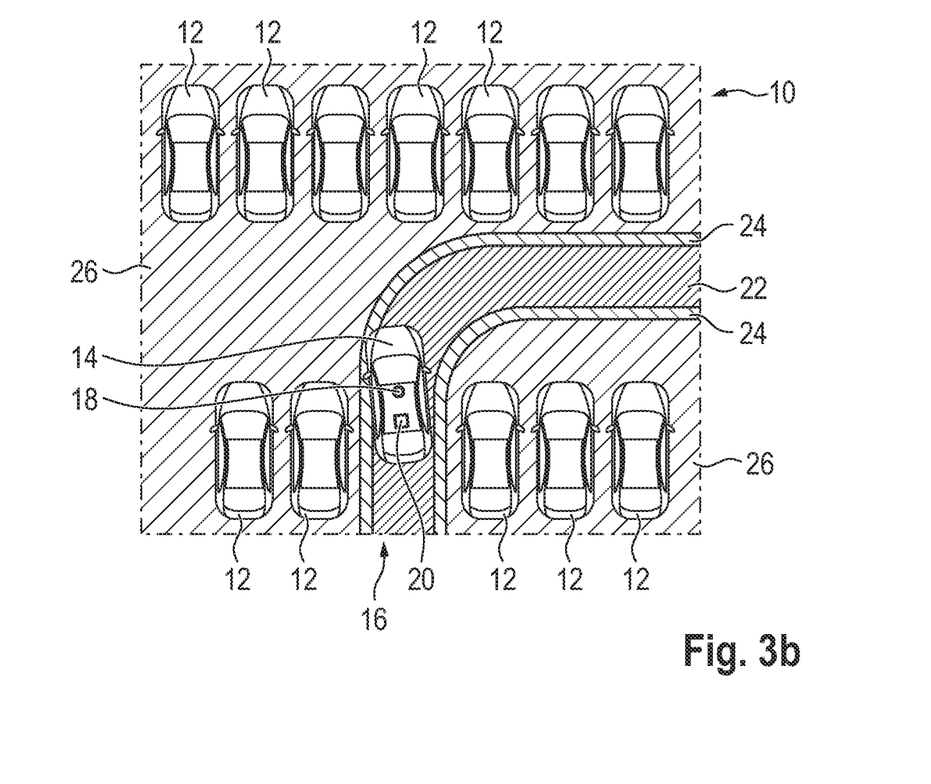
FIG. 3b shows another example schematic plan view of the parking area, wherein the motor vehicle is arranged in a region for which it is assumed that the driver of the motor vehicle may park in the target parking space in one move independently and without assistance using the current driving settings.

In the situation shown in FIG. 1*b*, the position 18 of the motor vehicle 14 is arranged in the first region 22, and therefore the at least one steering torque is not applied to the steering of the motor vehicle 14. When the position 18 of the motor vehicle 14 is arranged in the first region 22, it is assumed that the driver may arrange the motor vehicle 14 safely in the target parking space 16 in one move without assistance. In the situation shown in FIG. 2*b*, the driver has navigated the motor vehicle 14 into a position 18 in the second region 24, in which the motor vehicle 14 cannot be parked in the target parking space 16 in one move with the current driving settings. As such, as may be seen in the associated graph in FIG. 2*a*, the at least one steering torque is applied to the steering of the motor vehicle 14 as an additional steering torque 28, which may amplify actuation of the steering by the driver in order to assist the driver with the manual parking procedure of the motor vehicle 14. In this connection, a steering torque that amplifies the steering movement and/or a steering torque that impedes a steering movement may be applied to the steering. For example, a steering torque that facilitates a steering movement may be applied to the steering in a first steering direction and a steering torque that impedes the steering movement may be applied in the opposing second steering direction. In order to prevent the motor vehicle 14 from being steered further in the second steering direction, a vibration of the steering wheel may be triggered and/or a jolt of the steering wheel may be triggered. As a result, the driver of the motor vehicle 14 may be prompted to steer the motor vehicle 14 in the facilitated first steering direction, such that the motor vehicle 14 may be parked in one move in the target parking space 16. By assisting the driver by means of the steering torque applied to the steering, when the motor vehicle 14 is moved further, the motor vehicle 14 may be moved back into the first region 22, as shown in FIG. 3*b*. As soon as the motor vehicle 14 is arranged back in a position 18 in the first region 22, no further assistance by means of application of a steering torque to the steering is provided to the driver of the motor vehicle 14.

Figure 4A:
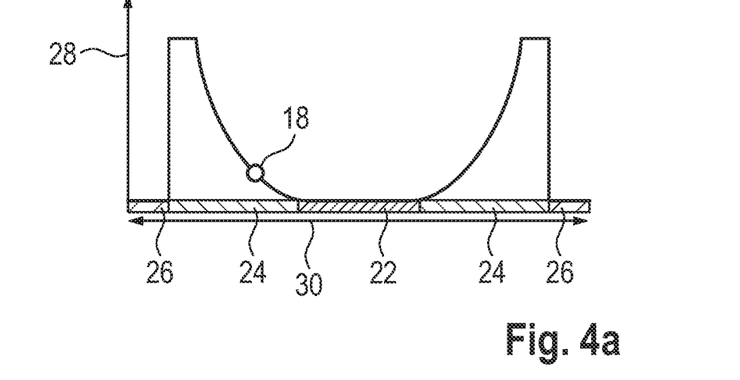
FIG. 4a shows an example graph which shows the additional steering torque that is applied as the steering torque to the steering of the motor vehicle for the travel region reached by the motor vehicle in order to make it possible to park the motor vehicle in the target parking space in only one additional move.
Figure 4B:
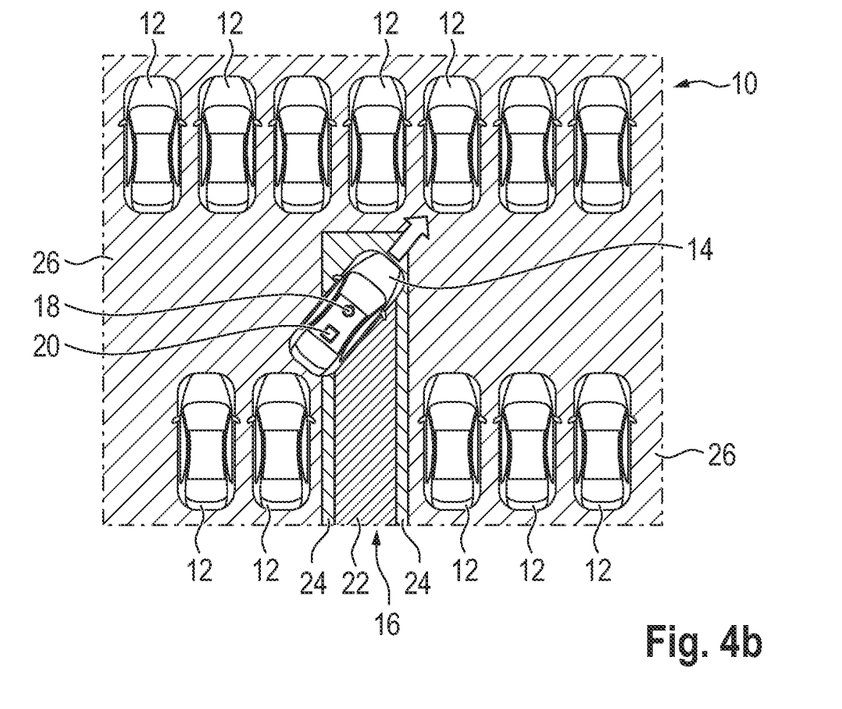
FIG. 4b shows another schematic plan view of the parking area, wherein the motor vehicle is moved by being maneuvered into the region in which the driver may park the motor vehicle in the target parking space in one additional move if the driver is assisted with control of the motor vehicle by means of application of the steering torque to the steering of the motor vehicle.

FIG. 4*b* shows a situation in which the driver of the motor vehicle 14 is correcting the position of the motor vehicle 14 in order to arrange the motor vehicle 14 in the first region 22. As a result, the driver of the motor vehicle 14 may be assisted using the processor 20 during a parking procedure in the target parking space 16 consisting of two moves.

In the method, it is therefore determined which of the regions the motor vehicle 14 is located in. If it is established that the motor vehicle 14 is located in the second region 24, the provision of the steering torque for the steering is triggered. If it is established using the processor 20 that the motor vehicle 14 is located in the first region 22, the steering torque is not provided for the steering of the motor vehicle 14. In order to be able to inform a driver in a particularly simple manner as to which of the regions the position 18 of the motor vehicle 14 is located in in each case, an output apparatus not shown in the FIGS. may be provided in the motor vehicle 14, by means of which the determined regions and the position 18 of the motor vehicle 14 relative to the respective determined regions may be output.

In order to keep the risk of a collision particularly low during the manual parking procedure, the respective assignment of the regions may be determined based on at least one object, for example on a safety distance to be maintained from the at least one object. In the present case, the regions may be assigned based on respective positions of the vehicles 12 and on the respective safety distances to be maintained from the vehicles 12. As a result, a risk of the motor vehicle 14 colliding with the vehicles 12 when parking in the target parking space 16 may be kept particularly low. The respective regions may be redetermined or respectively readjusted when at least one driving setting of the motor vehicle 14 changes and/or when the position 18 of the motor vehicle 14 changes.

In order to assist the driver with control of the motor vehicle 14, when the motor vehicle 14 drives past a parking space that is suitable as the target parking space 16, the surroundings of the motor vehicle 14 may be detected and measured by means of a sensor system, for example radar. For example, it may be determined using the processor 20 that the manual parking procedure is started when the motor vehicle 14 is stopped and/or when a turn signal of the motor vehicle 14 is activated and/or when a parking button of the motor vehicle 14 is actuated and/or when the motor vehicle 14 steers in and/or when a speed of the motor vehicle 14 falls below a predefined threshold value.

The surroundings of the motor vehicle 14 detected by means of the sensors is split into the different regions. The motor vehicle 14 may easily reach the target parking space 16 in the first region 22, wherein no steering assistance by means of application of the steering torque to the steering is provided. When the position 18 of the motor vehicle 14 is arranged in the second region 24, the target parking space 16 may still be reached, but the at least one steering torque is applied to the steering of the motor vehicle 14 in order to assist the driver. When the position 18 of the motor vehicle 14 is arranged in the third region 26, it is not possible to reach the target parking space 16 in one move and therefore steering assistance is not provided. The corresponding determined regions may be stored in the processor 20 in the form of a heat map or table of values. When the motor vehicle 14 moves, the regions may be redetermined with a sufficiently high sampling rate, for example after a predefined distance has been covered. This is particularly beneficial, since the regions may change continuously depending on steering movements of the motor vehicle 14. In order to limit the computing effort, regions further away from the motor vehicle 14 may be determined with a coarser resolution. In order to determine the respective regions, it is possible to draw on the detected surroundings of the motor vehicle 14 and/or vehicle dimensions of the motor vehicle 14 and/or a current steering angle and/or a maximum steering angle of the motor vehicle 14 and/or a setting of the gearshift lever of the motor vehicle 14 and/or safety distances to be maintained from obstacles and/or convenience- or respectively vehicle-specific settings of the motor vehicle 14. In addition to the position 18 of the motor vehicle 14 in the respective regions, a current steering angle may also be relevant for the steering torque to be applied to the steering in order to assist the driver. If a required steering angle for reaching the target parking space 16 is achieved, the further steering torque is not applied to the steering of the motor vehicle 14.

A safety distance to be maintained by the motor vehicle 14 from vehicles 12 and/or posts and/or lamps and/or dynamic objects such as pedestrians may be specified in the surroundings of the motor vehicle 14. The relevant specified safety distance may depend on a visibility of the relevant object or on a clarity of the target parking space 16.

FIG. 4*b* shows a second move of a parking procedure consisting of three moves. In this case, the driver may be assisted with the manual parking procedure of the motor vehicle 14 in that the at least one steering torque is applied to the steering of the motor vehicle 14 or the steering torque is not applied to the steering of the motor vehicle 14 depending on the arrangement of the position 18 of the motor vehicle 14 relative to the regions.

In summary, the invention shows how a driver of the motor vehicle 14 may be assisted by means of a temporary additional steering torque 28.

LIST OF REFERENCE NUMERALS

10 Parking area
12 Vehicle
14 Motor vehicle
16 Target parking space
18 Position
20 Electronic computing apparatus
22 First region
24 Second region
26 Third region
28 Additional steering torque
30 Travel region The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "for example" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for assisting a driver with a manual parking procedure of a motor vehicle, comprising, using a processor:
    determining a target parking space and a position of the motor vehicle;
    determining at least one driving setting of the motor vehicle;
    determining a reachability of the target parking space proceeding from the position using the at least one determined driving setting;
    if it is determined that the target parking space cannot be reached proceeding from the position in a continuous movement without collision with the at least one determined driving setting, selectively actuating a steering of the motor vehicle by applying at least one additional steering torque to the steering in addition to a steering torque applied by a driver, wherein if the steering torque applied by the driver corresponds to a first steering movement, the at least one additional steering torque is an impeding steering torque that impedes the first steering movement, and if the steering torque applied by the driver corresponds to a second steering movement counter to the first steering movement, the at least one additional steering torque is a facilitating steering torque that amplifies the second steering movement; and
    if it is determined that the target parking space can be reached by the motor vehicle proceeding from the position in a continuous movement without collision with the at least one determined driving setting, selectively disabling the additional steering torque.

2. The method of claim 1, comprising
    depending on the at least one determined driving setting, splitting the surroundings of the motor vehicle into at least two different regions, wherein a first region characterizes the reachability of the target parking space for the at least one determined driving setting and a second region characterizes an unreachability of the target parking space for the at least one determined driving setting;
    determining which of the regions the motor vehicle is located in; and
    providing the steering torque for the steering if it is established that the motor vehicle is located in the second region, whereas the steering torque is not provided if it is established that the motor vehicle is located in the first region.

3. The method of claim 2, wherein a third region is also provided in the surroundings of the motor vehicle, which third region characterizes an unreachability of the target parking space in a continuous movement without collision regardless of the determined driving setting.

4. The method of claim 3, comprising outputting the determined regions.

5. The method of claim 3, comprising assigning at least one of the regions depending on a predefined safety distance to be maintained from at least one detected object.

6. The method of claim 3, comprising, if it is determined that the target parking space cannot be reached proceeding from the position of the motor vehicle regardless of the determined driving setting, not providing the steering torque.

7. The method of claim 2, comprising outputting the determined regions.

8. The method of claim 7, comprising assigning at least one of the regions depending on a predefined safety distance to be maintained from at least one detected object.

9. The method of claim 7, comprising, if it is determined that the target parking space cannot be reached proceeding from the position of the motor vehicle regardless of the determined driving setting, not providing the steering torque.

10. The method of claim 2, comprising assigning at least one of the regions depending on a predefined safety distance to be maintained from at least one detected object.

11. The method of claim 10, comprising, if it is determined that the target parking space cannot be reached proceeding from the position of the motor vehicle regardless of the determined driving setting, not providing the steering torque.

12. The method of claim 2, comprising, if it is determined that the target parking space cannot be reached proceeding from the position of the motor vehicle regardless of the determined driving setting, not providing the steering torque.

13. The method of claim 1, comprising, if it is determined that the target parking space cannot be reached proceeding from the position of the motor vehicle regardless of the determined driving setting, not providing the steering torque.

14. The method of claim 1, comprising adjusting the determined reachability of the target parking space if it is determined that the at least one determined driving setting and/or the position of the motor vehicle has been adjusted.

15. The method of claim 14, comprising depending on the at least one determined driving setting, splitting the surroundings of the motor vehicle into at least two different regions, wherein a first region characterizes the reachability of the target parking space for the at least one determined driving setting and a second region characterizes an unreachability of the target parking space for the at least one determined driving setting;

determining which of the regions the motor vehicle is located in; and providing the steering torque for the steering if it is established that the motor vehicle is located in the second region, whereas the steering torque is not provided if it is established that the motor vehicle is located in the first region.

16. The method of claim 15, wherein a third region is also provided in the surroundings of the motor vehicle, which third region characterizes an unreachability of the target parking space in a continuous movement without collision regardless of the determined driving setting.

17. The method of claim 14, comprising, if it is determined that the target parking space cannot be reached proceeding from the position of the motor vehicle regardless of the determined driving setting, not providing the steering torque.

18. The method of claim 1, wherein one or more of a set steering angle, a maximum possible steering angle, an engaged gear, and a wheel base of the motor vehicle is determined as the driving setting.

19. A motor vehicle, which is configured to:

determine a target parking space and a position of the motor vehicle;

determine at least one driving setting of the motor vehicle;

determine a reachability of the target parking space proceeding from the position using the at least one determined driving setting;

if it is determined that the target parking space cannot be reached proceeding from the position in a continuous movement without collision with the at least one determined driving setting, selectively actuate a steering of the motor vehicle applying at least one additional steering torque to the steering in addition to a steering torque applied by a driver, wherein if the steering torque applied by the driver corresponds to a first steering movement, the at least one additional steering torque is an impeding steering torque that impedes the first steering movement, and if the steering torque applied by the driver corresponds to a second steering movement counter to the first steering movement, the at least one additional steering torque is a facilitating steering torque that amplifies the second steering movement; and if it is determined that the target parking space can be reached by the motor vehicle proceeding from the position in a continuous movement without collision with the at least one determined driving setting, selectively disable the additional steering torque.

* * * * *